(12) United States Patent
Kroener

(10) Patent No.: US 12,519,324 B2
(45) Date of Patent: Jan. 6, 2026

(54) METHOD FOR ADJUSTING AN ANODE OVERVOLTAGE OF A LITHIUM-ION BATTERY, METHOD FOR IMPROVING A CAPACITY STATE OF HEALTH OF THE LITHIUM-ION BATTERY

(71) Applicant: Robert Bosch GmbH, Stuttgart (DE)

(72) Inventor: Christoph Kroener, Freiberg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 895 days.

(21) Appl. No.: 17/769,369

(22) PCT Filed: Oct. 7, 2020

(86) PCT No.: PCT/EP2020/078067
§ 371 (c)(1),
(2) Date: Apr. 15, 2022

(87) PCT Pub. No.: WO2021/073964
PCT Pub. Date: Apr. 22, 2021

(65) Prior Publication Data
US 2023/0223769 A1    Jul. 13, 2023

(30) Foreign Application Priority Data

Oct. 17, 2019  (DE) ..................... 10 2019 216 015.8

(51) Int. Cl.
*H02J 7/00*  (2006.01)
*H01M 10/0525*  (2010.01)
*H01M 10/42*  (2006.01)

(52) U.S. Cl.
CPC ..... *H02J 7/00308* (2020.01); *H01M 10/0525* (2013.01); *H02J 7/0048* (2020.01);
(Continued)

(58) Field of Classification Search
CPC ............ G01R 31/396; H01M 10/0525; H01M 10/42; H01M 10/44; H01M 10/48;
(Continued)

(56) References Cited

U.S. PATENT DOCUMENTS 5,077,151 A * 12/1991 Yasuda ................. H01M 4/661
 429/219
6,366,056 B1 * 4/2002 Podrazhansky ....... H01M 10/44
 320/141

(Continued)

FOREIGN PATENT DOCUMENTS

CN          105870525 A       8/2016
CN          106450536 B  * 12/2018  ............ H01M 10/44
(Continued)

OTHER PUBLICATIONS

Translation of International Search Report for Application No. PCT/EP2020/078067 dated Jan. 13, 2021 (2 pages).

*Primary Examiner* — Drew A Dunn
*Assistant Examiner* — Frank Alexis Silva
(74) *Attorney, Agent, or Firm* — Michael Best & Friedrich LLP

(57) ABSTRACT

A method for adjusting an anode overvoltage of a lithium-ion battery (310) is described. A method for improving a capacity state of health of a lithium-ion battery (310) is described. A vehicle having at least one lithium-ion battery (310) whose anode overvoltage is adjusted using the method for adjusting the anode overvoltage of the lithium-ion battery (310) and/or whose capacity state of health is improved using the method for improving the capacity state of health of the lithium-ion battery (310) is described. A fleet management system that is designed to perform the method for adjusting the anode overvoltage of the lithium-ion battery (Continued)

(310) and/or the method for improving the capacity state of health of the lithium-ion battery (310) is described.

11 Claims, 3 Drawing Sheets

(52) U.S. Cl.
CPC .......... *H02J 7/005* (2020.01); *H02J 7/00712* (2020.01); *H01M 2010/4271* (2013.01); *H01M 2010/4278* (2013.01)

(58) Field of Classification Search
CPC ... H01M 2010/4271; H01M 2010/4278; H02J 7/00308; H02J 7/0048; H02J 7/005; H02J 7/00712; Y02E 60/10
USPC ........................................................ 320/162
See application file for complete search history.

(56) References Cited

U.S. PATENT DOCUMENTS

| | | | | |
|---|---|---|---|---|
| 6,636,020 | B1* | 10/2003 | Ronald | H02J 7/0031 |
| | | | | 320/128 |
| 8,062,793 | B2* | 11/2011 | Morigaki | H01M 4/625 |
| | | | | 429/231.95 |
| 8,093,902 | B2* | 1/2012 | Nishi | H01M 10/44 |
| | | | | 324/426 |
| 8,368,357 | B2* | 2/2013 | Ghantous | H02J 7/00711 |
| | | | | 320/157 |
| 8,427,112 | B2* | 4/2013 | Ghantous | H01M 10/48 |
| | | | | 320/140 |
| 8,513,921 | B2* | 8/2013 | Berkowitz | H02J 7/0048 |
| | | | | 320/141 |
| 8,548,762 | B2* | 10/2013 | Prada | G01R 31/3842 |
| | | | | 702/182 |
| 8,791,669 | B2* | 7/2014 | Ghantous | G01R 31/382 |
| | | | | 320/155 |
| 9,035,621 | B2* | 5/2015 | Berkowitz | H01M 10/44 |
| | | | | 320/155 |
| 9,121,910 | B2* | 9/2015 | Maluf | H01M 10/48 |
| 9,153,991 | B2* | 10/2015 | Chaturvedi | H01M 10/443 |
| 9,366,732 | B2* | 6/2016 | Fahimi | G01R 31/392 |
| 9,791,513 | B2* | 10/2017 | Maluf | G01R 31/3648 |
| 9,899,680 | B2* | 2/2018 | Tsuji | H01M 10/0525 |
| 9,995,794 | B2* | 6/2018 | Yazami | G01R 31/392 |
| 10,036,781 | B2* | 7/2018 | Vinassa | G01R 31/367 |
| 10,067,198 | B2* | 9/2018 | Maluf | H02J 7/0048 |
| 10,297,872 | B2* | 5/2019 | Paz | H01M 10/446 |
| 10,371,753 | B1* | 8/2019 | Wang | H01M 10/48 |
| 10,389,141 | B2* | 8/2019 | Roumi | H02J 13/00002 |
| 10,439,254 | B2* | 10/2019 | Paz | H01M 10/446 |
| 10,449,861 | B1* | 10/2019 | Wu | B60L 58/10 |
| 10,511,050 | B1* | 12/2019 | Rahimian | H01M 10/0525 |
| 10,587,139 | B2* | 3/2020 | Oh | H02J 7/007194 |
| 10,720,786 | B2* | 7/2020 | Jung | H02J 7/0071 |
| 10,809,049 | B2* | 10/2020 | Ghantous | H01M 10/425 |
| 10,833,318 | B2* | 11/2020 | Greer | H01M 4/663 |
| 10,855,098 | B2* | 12/2020 | Guibene | H02J 50/10 |
| 10,886,767 | B2* | 1/2021 | Kim | H01M 10/484 |
| 10,903,668 | B2* | 1/2021 | Roumi | H02J 7/00714 |
| 10,913,361 | B2* | 2/2021 | Ko | H01M 10/486 |
| 11,034,243 | B2* | 6/2021 | Wu | B60L 58/10 |
| 11,056,901 | B2* | 7/2021 | Song | H02J 7/00 |
| 11,063,290 | B2* | 7/2021 | Park | H01M 4/628 |
| 11,079,212 | B2* | 8/2021 | Ghantous | H01M 10/44 |
| 11,088,558 | B2* | 8/2021 | Jung | H01M 10/0525 |
| 11,196,103 | B2* | 12/2021 | Oniki | G01R 19/16542 |
| 11,209,489 | B2* | 12/2021 | Takahashi | G01R 31/392 |
| 11,397,215 | B2* | 7/2022 | Ghantous | G01R 31/392 |
| 11,397,216 | B2* | 7/2022 | Ghantous | G01R 31/392 |
| 11,412,453 | B2* | 8/2022 | Kim | G06F 1/3278 |
| 11,462,774 | B2* | 10/2022 | Zhang | H01M 4/587 |
| 11,552,494 | B2* | 1/2023 | Kim | H01M 10/486 |
| 11,567,136 | B2* | 1/2023 | Guibene | H04W 4/20 |
| 11,641,027 | B2* | 5/2023 | Takahashi | H01M 10/482 |
| | | | | 429/61 |
| 11,652,200 | B2* | 5/2023 | Rosenne | H01M 10/42 |
| | | | | 429/162 |
| 11,728,525 | B2* | 8/2023 | Ghantous | H02J 7/0047 |
| | | | | 702/63 |
| 11,831,183 | B2* | 11/2023 | Roumi | H02J 7/00714 |
| 11,848,426 | B2* | 12/2023 | Zhang | H02J 7/0047 |
| 11,876,215 | B2* | 1/2024 | Lee | H01M 4/366 |
| 11,892,512 | B2* | 2/2024 | Guibene | H04W 4/20 |
| 11,940,500 | B1* | 3/2024 | Chang | H02J 7/00 |
| 11,967,848 | B2* | 4/2024 | Zhong | H01M 10/425 |
| 11,988,716 | B2* | 5/2024 | Allam | H02J 7/0048 |
| 12,095,053 | B2* | 9/2024 | Oniki | G01R 31/392 |
| 12,132,339 | B2* | 10/2024 | Ghantous | H02J 7/0048 |
| 12,136,708 | B2* | 11/2024 | Ghantous | H01M 10/44 |
| 12,176,497 | B2* | 12/2024 | Ghantous | H01M 10/44 |
| 12,222,400 | B2* | 2/2025 | Baumann | G01R 31/367 |
| 12,237,477 | B2* | 2/2025 | Zhang | G01R 31/392 |
| 2006/0070886 | A1* | 4/2006 | Saunders | H01M 4/86 |
| | | | | 429/432 |
| 2006/0238168 | A1 | 10/2006 | Matsuo et al. | |
| 2008/0206610 | A1* | 8/2008 | Saunders | H01M 8/04589 |
| | | | | 429/415 |
| 2009/0123844 | A1* | 5/2009 | Morigaki | H01M 4/62 |
| | | | | 429/231.95 |
| 2010/0085057 | A1* | 4/2010 | Nishi | H01M 10/44 |
| | | | | 324/427 |
| 2010/0233543 | A1* | 9/2010 | Numata | H01M 4/366 |
| | | | | 429/224 |
| 2011/0054816 | A1* | 3/2011 | Prada | G01R 31/367 |
| | | | | 702/63 |
| 2011/0060538 | A1* | 3/2011 | Fahimi | G01R 31/392 |
| | | | | 702/63 |
| 2011/0316548 | A1 | 12/2011 | Ghantous et al. | |
| 2012/0032648 | A1* | 2/2012 | Ghantous | H02J 7/00 |
| | | | | 320/139 |
| 2012/0105069 | A1* | 5/2012 | Wang | G01R 31/392 |
| | | | | 324/427 |
| 2012/0203483 | A1* | 8/2012 | Ghantous | G01R 31/388 |
| | | | | 702/63 |
| 2012/0316814 | A1* | 12/2012 | Rahaman | G01R 31/392 |
| | | | | 702/63 |
| 2013/0029210 | A1* | 1/2013 | Minoura | H01M 4/627 |
| | | | | 429/163 |
| 2013/0091083 | A1* | 4/2013 | Frisch | G01R 31/367 |
| | | | | 706/14 |
| 2013/0154548 | A1* | 6/2013 | Berkowitz | G01R 31/3835 |
| | | | | 320/128 |
| 2013/0157118 | A1* | 6/2013 | Shibahara | H01M 10/121 |
| | | | | 429/163 |
| 2014/0002031 | A1* | 1/2014 | Chaturvedi | H01M 10/44 |
| | | | | 320/152 |
| 2014/0021959 | A1* | 1/2014 | Maluf | H02J 7/0048 |
| | | | | 324/426 |
| 2014/0312912 | A1 | 10/2014 | Berkowitz et al. | |
| 2015/0219722 | A1* | 8/2015 | Maluf | H02J 7/00711 |
| | | | | 324/426 |
| 2015/0321572 | A1* | 11/2015 | Koch | H01M 10/425 |
| | | | | 701/1 |
| 2015/0377976 | A1* | 12/2015 | Maluf | G01R 31/392 |
| | | | | 702/63 |
| 2015/0377977 | A1* | 12/2015 | Yazami | G01R 31/392 |
| | | | | 324/426 |
| 2016/0011274 | A1* | 1/2016 | Morita | G01R 31/392 |
| | | | | 702/63 |
| 2016/0116548 | A1* | 4/2016 | Ghantous | H01M 10/425 |
| | | | | 702/63 |
| 2016/0190825 | A1* | 6/2016 | Lih | H02J 7/007194 |
| | | | | 320/152 |
| 2016/0190833 | A1* | 6/2016 | Roumi | H02J 7/00 |
| | | | | 320/136 |
| 2016/0241058 | A1* | 8/2016 | Carralero | H02J 7/007 |
| 2016/0245876 | A1* | 8/2016 | Vinassa | H02J 7/005 |
| 2016/0344068 | A1* | 11/2016 | Kim | H01M 10/4257 |
| 2017/0115355 | A1* | 4/2017 | Willard | G01R 31/3648 |

(56) References Cited

U.S. PATENT DOCUMENTS

| | | |
|---|---|---|
| 2017/0170653 A1* | 6/2017 | Song .................... H02H 9/025 |
| 2017/0187047 A1* | 6/2017 | Mizutani ............... H01M 4/926 |
| 2017/0194673 A1* | 7/2017 | Jeon ........................ H04Q 9/00 |
| 2017/0222447 A1* | 8/2017 | Ravi .................... H01M 10/48 |
| 2017/0244255 A1* | 8/2017 | Luo .................. H02J 7/007182 |
| 2017/0288447 A1* | 10/2017 | Guibene ............. G01R 31/382 |
| 2017/0338666 A1* | 11/2017 | Christensen ......... G01R 31/392 |
| 2018/0029491 A1* | 2/2018 | Saint-Marcoux ....... B60L 58/24 |
| 2018/0145528 A1* | 5/2018 | Oh ............................ H02J 7/04 |
| 2018/0149462 A1* | 5/2018 | Ghantous ........... H01M 10/425 |
| 2019/0001828 A1* | 1/2019 | Ko .................... H01M 10/6571 |
| 2019/0041464 A1* | 2/2019 | Chow .................. G01R 31/392 |
| 2019/0072618 A1* | 3/2019 | Ghantous ............ G01R 31/392 |
| 2019/0089015 A1* | 3/2019 | Paz .................... H01M 10/0525 |
| 2019/0089016 A1* | 3/2019 | Paz .................... H01M 10/446 |
| 2019/0103600 A1* | 4/2019 | Greer ................. H01M 4/8626 |
| 2019/0120910 A1* | 4/2019 | Ghantous ............. H02J 7/0047 |
| 2019/0123574 A1* | 4/2019 | Jung .................... H01M 10/44 |
| 2019/0148784 A1* | 5/2019 | Paz .................... H01M 10/0525 |
| | | 429/7 |
| 2019/0195956 A1* | 6/2019 | Lim .................. H01M 10/4207 |
| 2019/0198941 A1* | 6/2019 | Oniki .................. G01R 31/36 |
| 2019/0229378 A1* | 7/2019 | Zhang .................... B60L 58/12 |
| 2019/0237975 A1* | 8/2019 | Song .................... H01M 4/587 |
| 2019/0250215 A1* | 8/2019 | Sung .................. G01R 31/367 |
| 2019/0252898 A1* | 8/2019 | Kim .................. H02J 7/007188 |
| 2019/0363551 A1* | 11/2019 | Patey .................. G01R 31/3842 |
| 2020/0006962 A1* | 1/2020 | Roumi ............. H02J 13/00002 |
| 2020/0018799 A1* | 1/2020 | Lim .................. G01R 31/3842 |
| 2020/0088797 A1* | 3/2020 | Takahashi ........... G01R 31/385 |
| 2020/0091567 A1* | 3/2020 | Takahashi ............. H01M 10/48 |
| 2020/0122581 A1* | 4/2020 | Wu ....................... B60L 58/10 |
| 2020/0144592 A1* | 5/2020 | Rosenne .......... H01M 10/0525 |
| 2020/0227791 A1* | 7/2020 | Flueckiger .......... H01M 10/425 |
| 2020/0235441 A1* | 7/2020 | Rahimian ........... H01M 10/425 |
| 2020/0292622 A1* | 9/2020 | Wu ...................... G01R 31/396 |
| 2020/0335993 A1* | 10/2020 | Jung ..................... H01M 10/44 |
| 2021/0013731 A1* | 1/2021 | Choe ..................... H01M 10/44 |
| 2021/0041504 A1* | 2/2021 | Song .................... G01R 31/367 |
| 2021/0043924 A1* | 2/2021 | Lee ........................ H01M 4/364 |
| 2021/0084594 A1* | 3/2021 | Kim ...................... G06F 1/3278 |
| 2021/0098995 A1* | 4/2021 | Zhong ................ H01M 10/425 |
| 2021/0119464 A1* | 4/2021 | Kim ...................... H01M 10/44 |
| 2021/0129705 A1* | 5/2021 | Head .................. H01M 10/4257 |
| 2021/0148987 A1* | 5/2021 | Ghantous ............. G01R 31/392 |
| 2021/0210965 A1* | 7/2021 | Roumi ............. H02J 13/00002 |
| 2021/0296931 A1* | 9/2021 | Guibene ................. H04W 4/20 |
| 2021/0344212 A1* | 11/2021 | Jee ....................... G01R 31/367 |
| 2022/0069361 A1* | 3/2022 | Surampudi .......... H02J 7/00712 |
| 2022/0069370 A1* | 3/2022 | Oniki .................... B60L 3/0046 |
| 2022/0082630 A1* | 3/2022 | Takaoka .............. G01R 31/374 |
| 2022/0163589 A1* | 5/2022 | Allam ................. G01R 31/3842 |
| 2022/0244318 A1* | 8/2022 | Malmberg .......... G01R 31/3835 |
| 2022/0317198 A1* | 10/2022 | Ghantous ............. H01M 10/44 |
| 2022/0317199 A1* | 10/2022 | Ghantous ............. G01R 31/392 |
| 2022/0373609 A1* | 11/2022 | Baumann ............. G01R 31/392 |
| 2022/0374568 A1* | 11/2022 | Baumann ................ G06F 30/20 |
| 2023/0006271 A1* | 1/2023 | Ghantous ............. G01R 31/392 |
| 2023/0040026 A1* | 2/2023 | Zhang .................. H01M 10/44 |
| 2023/0160964 A1* | 5/2023 | Guibene ................ H02J 7/005 |
| | | 340/539.1 |
| 2023/0324461 A1* | 10/2023 | Roumi ................ G01R 31/392 |
| | | 324/430 |
| 2023/0335810 A1* | 10/2023 | Ghantous ............. H01M 10/44 |
| 2024/0079560 A1* | 3/2024 | Lee ........................ H01M 4/13 |
| 2024/0120558 A1* | 4/2024 | Zhang ................... H01M 4/583 |
| 2024/0175928 A1* | 5/2024 | Guibene ............... H02J 7/0048 |
| 2024/0283040 A1* | 8/2024 | Ghantous ............. H02J 7/0047 |
| 2024/0295605 A1* | 9/2024 | Bessler ............... G01R 31/374 |
| 2024/0313274 A1* | 9/2024 | Ghantous ............. H02J 7/0047 |
| 2024/0426921 A1* | 12/2024 | Leatherdale ......... G01R 31/396 |
| 2025/0172631 A1* | 5/2025 | Burchardt ............. G01R 31/392 |

FOREIGN PATENT DOCUMENTS

| | | |
|---|---|---|
| DE | 102010051009 A1 | 5/2012 |
| EP | 3197006 A2 | 7/2017 |
| WO | 2016100919 A1 | 6/2016 |

* cited by examiner

METHOD FOR ADJUSTING AN ANODE OVERVOLTAGE OF A LITHIUM-ION BATTERY, METHOD FOR IMPROVING A CAPACITY STATE OF HEALTH OF THE LITHIUM-ION BATTERY

BACKGROUND OF THE INVENTION

The invention relates to a method for adjusting an anode overvoltage of a lithium-ion battery.

The invention further relates to a method for improving a capacity state of health of a lithium-ion battery.

The invention also relates to a vehicle having at least one lithium-ion battery, whose anode overvoltage has been adjusted in accordance with the method for adjusting the anode overvoltage of the lithium-ion battery and/or whose capacity state of health has been improved in accordance with the method for improving the capacity state of health of the lithium-ion battery.

The invention also relates to a fleet management system, which is designed to perform the method for adjusting the anode overvoltage of the lithium-ion battery and/or the method for improving the capacity state of health of the lithium-ion battery.

Lithium-ion batteries are energy stores of the future. They can store a lot of current in little space with a comparatively low weight. However, lithium-ion batteries have the problem of lithium plating, in which metallic lithium is formed and deposited during charging of the lithium-ion batteries and thus shortens the life of the lithium-ion batteries or can even cause a short circuit or fire.

In order to estimate a capacity state of health (SOHC) of the lithium-ion battery, an anode overvoltage of the lithium-ion battery is used. It is assumed that the capacity state of health of the lithium-ion battery is normal if the anode overvoltage is far above 0 mV, and the capacity state of health of the lithium-ion battery is impaired, i.e. the ageing of the lithium-ion battery is accelerated by the increased lithium plating, as soon as the anode overvoltage comes to the 0 mV.

Document U.S. 2014/0312912 A1 discloses a method and circuitry to adaptively charge a battery.

Document U.S. 2006/0238168 A1 discloses a method for detecting battery properties.

SUMMARY OF THE INVENTION

A method for adjusting a limit value for an anode overvoltage of a lithium-ion battery is proposed.

First, signal characteristics of the lithium-ion battery are provided. The signal characteristics comprise at least voltage, current and operating temperature characteristics and a capacity state of health characteristic of the lithium-ion battery. In this case, a capacity loss of the lithium-ion battery is represented by the capacity state of health characteristic.

The signal characteristics and the capacity state of health characteristic of the lithium-ion battery are then transmitted to a storage device. In this case, data relating to a plurality of lithium-ion batteries are stored in the storage device, wherein the data comprise at least voltage, current and operating temperature characteristics and a capacity state of health characteristic and a limit value for the anode overvoltage of the respective lithium-ion battery.

Then, the signal characteristics of the lithium-ion battery are compared with the data stored in the storage device, and comparison batteries having signal characteristics similar to the signal characteristics of the lithium-ion battery are chosen. The similarity between the signal characteristics can in this case be defined by means of a method of least squares. The lithium-ion batteries are preferably compared over similar time intervals.

Then, the data relating to the comparison batteries are investigated in order to obtain an average capacity state of health characteristic and an average capacity loss of the comparison batteries. In this case, an optimized limit value, corresponding to the average capacity loss, for the anode overvoltage is likewise obtained.

Then, the capacity state of health characteristic of the lithium-ion battery is compared with the average capacity state of health characteristic of the comparison batteries.

Then, the limit value for the anode overvoltage of the lithium-ion battery is adjusted to the optimized limit value for the anode overvoltage when it is identified that the capacity state of health characteristic of the lithium-ion battery is below the average capacity state of health characteristic of the comparison batteries. With the limit value for the anode overvoltage of the lithium-ion battery adjusted to the optimized limit value, the capacity loss of the lithium-ion battery corresponds to the average capacity loss.

Preferably, the signal characteristics and the capacity state of health characteristic of the lithium-ion battery are transmitted to the storage device by means of a wireless network.

In this case, the wireless network can be in the form of a WLAN. Preferably, the wireless network is in the form of a mobile radio network, such as, for example, a UMTS or LTE network.

Preferably, the storage device is in the form of cloud storage. However, it is also conceivable for the storage device to be in the form of a storage medium, such as, for example, a memory of a control device of the lithium-ion battery or an external memory.

Preferably, the storage device has a model based on artificial intelligence for adjusting the limit value for the anode overvoltage of the lithium-ion battery. Comparison batteries are chosen by means of the model based on artificial intelligence on the basis of the voltage, current and operating temperature characteristics of the lithium-ion battery in the data stored in the storage device. The data relating to the comparison batteries are investigated by means of the model based on artificial intelligence in order to obtain an average capacity state of health characteristic and an average capacity loss of the comparison batteries and an optimized limit value, corresponding to the average capacity loss, for the anode overvoltage. By comparison, the model based on artificial intelligence can identify that the capacity state of health characteristic of the lithium-ion battery is below the average capacity state of health characteristic and produce the optimized limit value for the anode overvoltage. The limit value for the anode overvoltage of the lithium-ion battery is then adjusted to the optimized limit value.

In addition, a method for improving a capacity state of health of a lithium-ion battery is proposed.

In this case, first a capacity state of health of the lithium-ion battery is calculated by means of a battery model. In this case, a limit value for an anode overvoltage of the lithium-ion battery is estimated. The battery model can of course calculate further parameters of the lithium-ion battery, such as, for example, a state of charge and a lithium-ion concentration.

Then, an optimum charging current for the lithium-ion battery is calculated by means of a charging model in such a way that the anode overvoltage of the lithium-ion battery does not fall below the limit value, i.e. the anode overvoltage of the lithium-ion battery should be greater than or at least equal to the limit value.

Then, the lithium-ion battery is charged with the optimum charging current and monitored. In this case, a capacity state of health characteristic and signal characteristics of the lithium-ion battery, which comprise at least voltage, current and operating temperature characteristics, are detected.

Then, the limit value for the anode overvoltage of the lithium-ion battery is adjusted by means of the method according to the invention for adjusting a limit value for an anode overvoltage of a lithium-ion battery.

Then, the optimum charging current is recalculated by means of the charging model using the adjusted limit value of the lithium-ion battery.

Preferably, the lithium-ion battery is provided with a battery management system for monitoring and controlling the lithium-ion battery and for detecting a capacity state of health characteristic and the signal characteristics of the lithium-ion battery. Preferably, the battery model is integrated in the battery management system.

Preferably, the optimum charging current is calculated on the basis of an optimal control theory. Preferably, the charging model is likewise integrated in the battery management system. In this case, the limit value for the anode overvoltage which has been estimated by the battery model can be transmitted directly to the charging model. It is likewise possible for the limit value to be set via the battery management system.

Preferably, the battery management system is provided with a telematic control unit for data transmission between the battery management system and the storage device.

The battery management system can also have a memory for storing data relating to the lithium-ion battery. The data relating to the lithium-ion battery include, for example, the anode overvoltage and further electrochemical parameters of the lithium-ion battery which are measured in a laboratory.

Also proposed is a vehicle having at least one lithium-ion battery, whose anode overvoltage has been adjusted in accordance with the method according to the invention for adjusting an anode overvoltage of a lithium-ion battery and/or whose capacity state of health has been improved in accordance with the method according to the invention for improving a capacity state of health of a lithium-ion battery.

Further information or parameters of the vehicle, such as, for example, a use profile of the vehicle and driving style of a driver, can in this case likewise be transmitted to the storage device.

In addition, a fleet management system is proposed which is designed to perform the method according to the invention for adjusting an anode overvoltage of a lithium-ion battery and/or the method according to the invention for improving a capacity state of health of a lithium-ion battery.

A fleet management system is used for managing, planning, controlling and monitoring fleets of vehicles, which are also referred to as car pools. In this case, routes of vehicles are adjusted with respect to one another and fixed, incorporating specific influencing parameters. Problems should be identified early, eliminated or avoided from the outset by a fleet management system.

In this case, the fleet management system can have a cloud-based storage device, in which data relating to the vehicles are stored. The data relating to the vehicles include both data relating to lithium-ion batteries which are used in the vehicles and use profiles of the vehicles and driving styles of drivers of the vehicles.

In recent years, there has been research, under high pressure, into precise battery models in order to model internal states, such as, for example, state of charge (SOC), lithium-ion concentration and anode overvoltage, and external states, in particular voltage, current and operating temperature. The aim of a precise description of an internal life of the battery is to optimize charging algorithms in such a way that the battery ages as little as possible or lasts as long as possible.

Until now, it has only been possible to vaguely argue how a limit value for an anode overvoltage should be fixed. An excessively high limit value would mean that the charging would be too conservative and increase a charging time. An excessively low value leads to aggressive charging and rapid ageing of the battery.

With the method according to the invention, the limit value for the anode overvoltage of the lithium-ion battery can be updated online in such a way that the limit value is always at the possible optimum. As a result, offline calibration is no longer required.

With the method according to the invention, a robust charging algorithm can be developed which regulates the charging current in such a way that the lithium-ion battery is handled as gently as possible while the charging duration and the energy content are optimized.

With the method according to the invention, either a charging duration of the lithium-ion battery can be optimized with gentle ageing of the lithium-ion battery or gentle ageing of the lithium-ion battery can be optimized with the same charging duration.

Furthermore, the method according to the invention forms a basis for data-based learning and can be developed further, such as, for example, for an optimal driving response and a gentle ageing response in the driving operating mode and in the parked operating mode.

BRIEF DESCRIPTION OF THE DRAWINGS

Embodiments of the invention will be explained in more detail with reference to the drawings and the description below.

In the drawings.

DETAILED DESCRIPTION

In the description of the embodiments of the invention below, identical or similar elements are denoted by the same reference symbols, wherein these elements have not been repeatedly described in individual cases. The figures represent the subject matter of the invention merely schematically.

Figure 1:
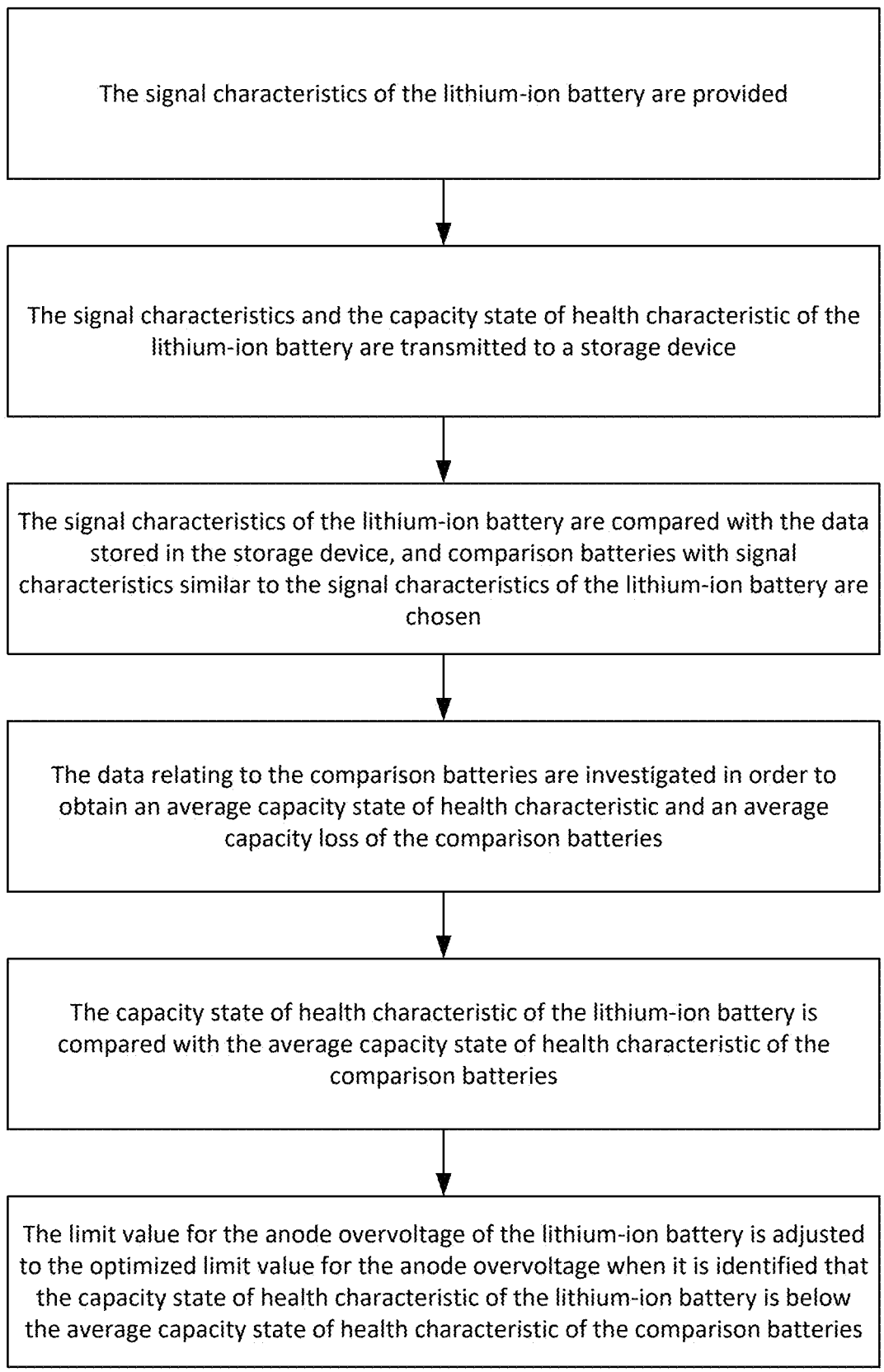
FIG. 1 shows a first flowchart of the method according to the invention for adjusting an anode overvoltage of a lithium-ion battery.
Figure 3:
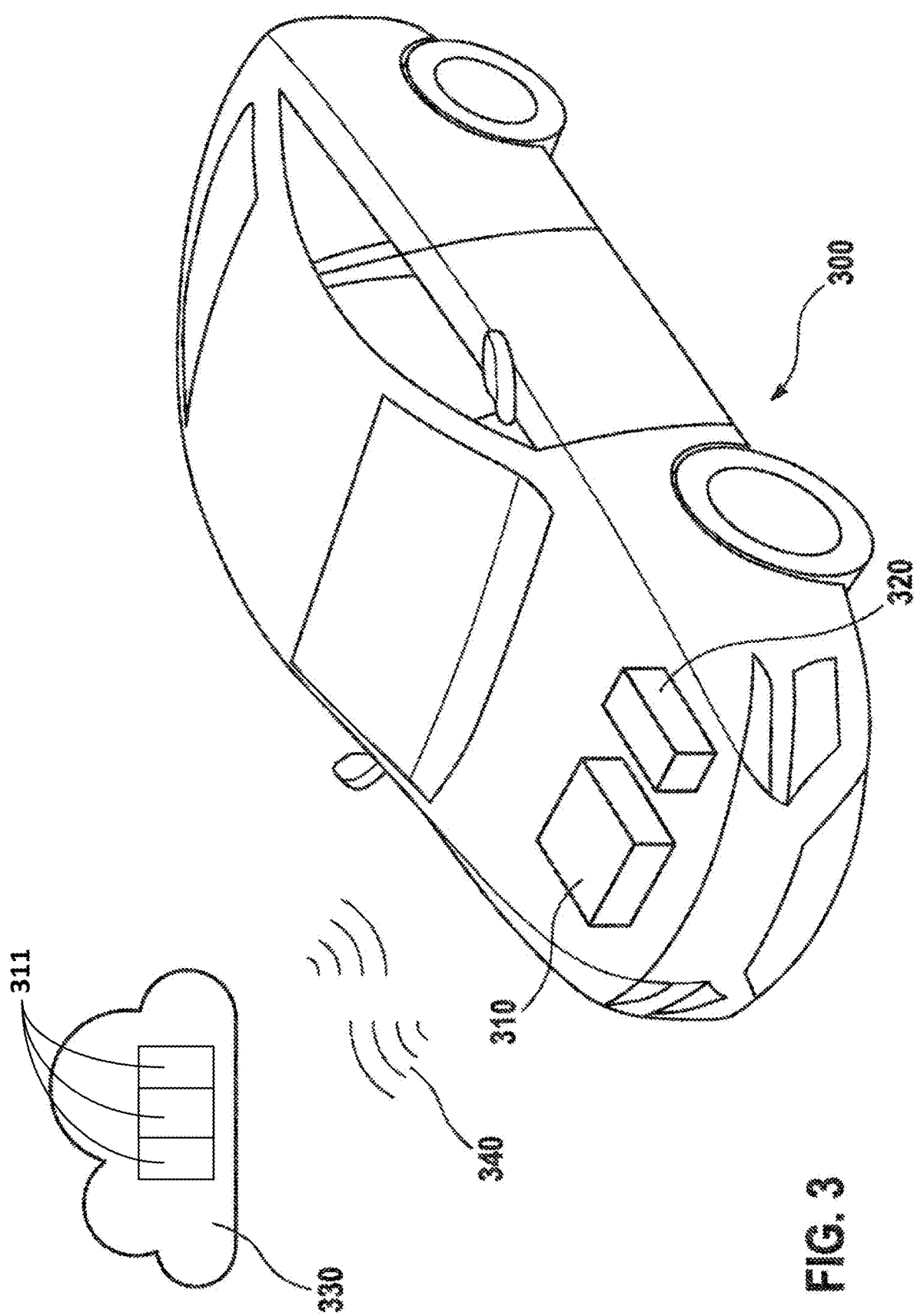
FIG. 3 shows a schematic illustration of a vehicle.

FIG. 1 shows a first flowchart 100 of the method according to the invention for adjusting an anode overvoltage of a lithium-ion battery 310 (see FIG. 3).

In a first step 101 of the first flowchart 100, signal characteristics of the lithium-ion battery 310 are provided, The signal characteristics comprise at least voltage, current and operating temperature characteristics and a capacity state of health characteristic of the lithium-ion battery 310.

In this case, a capacity loss of the lithium-ion battery 310 is represented by the capacity state of health characteristic.

Then, the signal characteristics and the capacity state of health characteristic of the lithium-ion battery 310 are transmitted to a storage device 330 (see FIG. 3) in a second step 102 of the first flowchart 100. In this case, data relating to a plurality of lithium-ion batteries 311 (e.g., including lithium-ion battery 310) are stored in the storage device 330, wherein the data comprise at least voltage, current and operating temperature characteristics and a capacity state of health characteristic and a limit value for the anode overvoltage of the respective lithium-ion battery 310.

In a third step 103 of the first flowchart 100, the signal characteristics of the lithium-ion battery 310 are compared with the data stored in the storage device 330, and comparison batteries with signal characteristics similar to the signal characteristics of the lithium-ion battery 310 are chosen.

In a fourth step 104 of the first flowchart 100, the data relating to the comparison batteries are investigated in order to obtain an average capacity state of health characteristic and an average capacity loss of the comparison batteries. In this case, an optimized limit value, corresponding to the average capacity loss, for the anode overvoltage is likewise obtained.

In a fifth step 105 of the first flowchart 100, the capacity state of health characteristic of the lithium-ion battery 310 is compared with the average capacity state of health characteristic of the comparison batteries.

In a sixth step 106 of the first flowchart 100, the limit value for the anode overvoltage of the lithium-ion battery 310 is adjusted to the optimized limit value for the anode overvoltage when it is identified that the capacity state of health characteristic of the lithium-ion battery 310 is below the average capacity state of health characteristic of the comparison batteries. With the limit value for the anode overvoltage of the lithium-ion battery 310 adjusted to the optimized limit value, the capacity loss of the lithium-ion battery corresponds to the average capacity loss.

Figure 2:
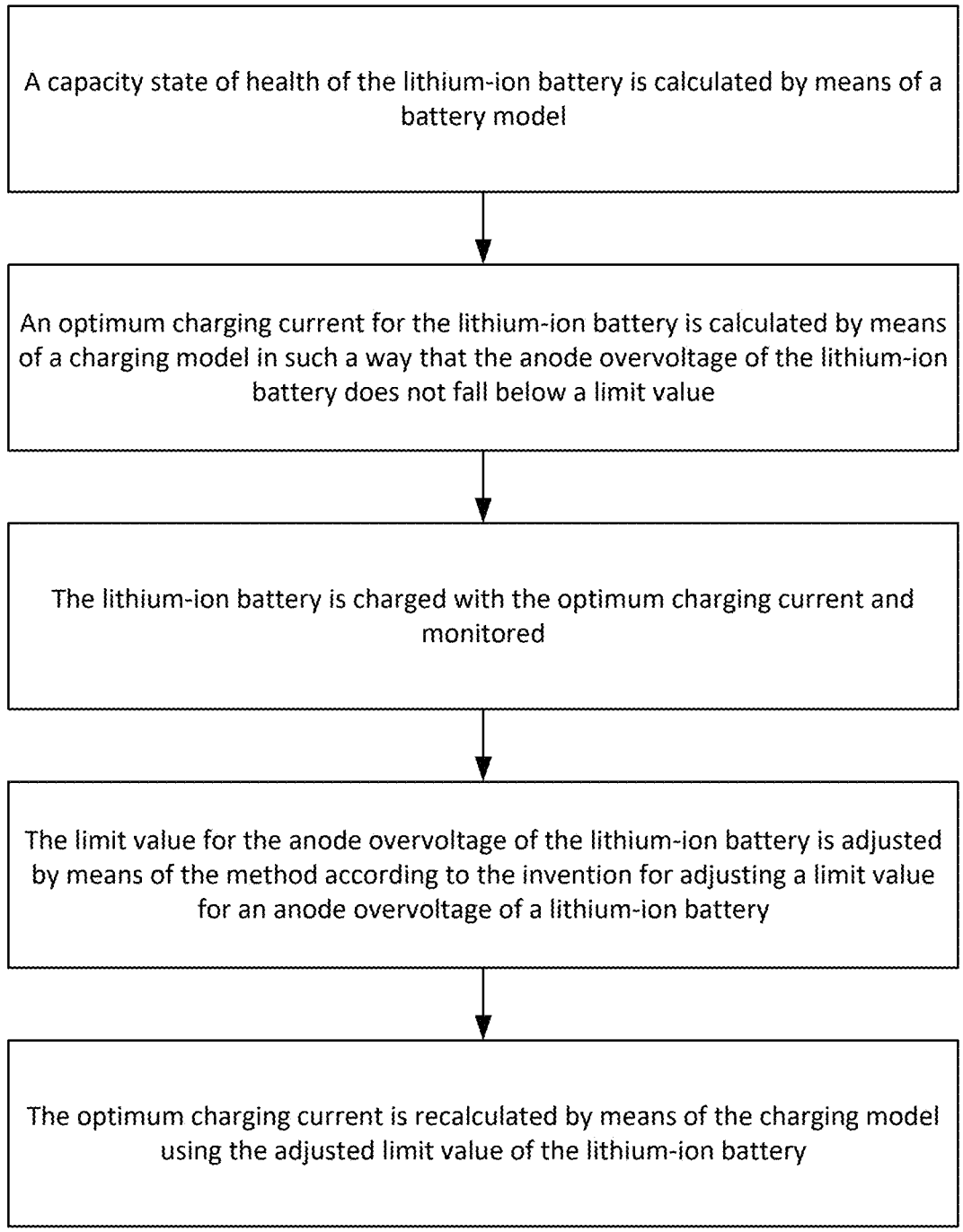
FIG. 2 shows a second flowchart of the method according to the invention for improving a capacity state of health of a lithium-ion battery.

FIG. 2 shows a second flowchart 200 of the method according to the invention for improving a capacity state of health of a lithium-ion battery 310.

In a first step 201 of the second flowchart 200, a capacity state of health of the lithium-ion battery 310 is calculated by means of a battery model. In this case, a limit value for an anode overvoltage of the lithium-ion battery 310 is estimated.

In a second step 202 of the second flowchart 200, an optimum charging current for the lithium-ion battery 310 is calculated by means of a charging model in such a way that the anode overvoltage of the lithium-ion battery 310 does not fall below a limit value, i.e. the anode overvoltage of the lithium-ion battery 310 should be greater than or at least equal to the limit value.

In a third step 203 of the second flowchart 200, the lithium-ion battery 310 is charged with the optimum charging current and monitored. In this case, a capacity state of health characteristic and signal characteristics of the lithium-ion battery, which comprise at least voltage, current and operating temperature characteristics, are detected.

In a fourth step 204 of the second flowchart 200, the limit value for the anode overvoltage of the lithium-ion battery 310 is adjusted by means of the method according to the invention for adjusting a limit value for an anode overvoltage of a lithium-ion battery, which is described in FIG. 1.

In a fifth step 205 of the second flowchart 200, the optimum charging current is recalculated by means of the charging model using the adjusted limit value of the lithium-ion battery 310.

FIG. 3 shows, schematically, a vehicle 300, which has a lithium-ion battery 310 and a battery management system 320.

The vehicle 300 furthermore comprises a telematic control unit (not illustrated), which is preferably integrated in the battery management system 320, for data transmission between the vehicle 300 or the lithium-ion battery 310 and a storage device 330 via a communication 340.

In this case, the storage device 330 is in the form of cloud storage and is used for storing data relating to a plurality of lithium-ion batteries 311 (e.g. including lithium-ion battery 310).

The data relating to the lithium-ion batteries 310 of the vehicle 300 are detected by the battery management systems 320 and transmitted to the storage device 330. The data relating to the lithium-ion battery 310 are then compared with the data which are stored in the storage device 330 in order to choose comparison batteries.

The storage device 330 is in this case designed to perform the method according to the invention for adjusting an anode overvoltage of a lithium-ion battery 310.

As soon as the anode overvoltage of the lithium-ion battery 310 is adjusted, the adjusted anode overvoltage is sent between the battery management system 320 and the storage device 330 at the battery management system 320 via the communication 340. A charging model (not illustrated) of the battery management system 320 recalculates an optimum charging current on the basis of the adjusted anode overvoltage in order that a capacity loss of the lithium-ion battery 310 of the vehicle 300 corresponds to an average capacity loss of the comparison batteries.

The vehicle 300 can be assigned to a fleet of vehicles, and the storage device 300 can be assigned to a fleet management system for managing, planning, controlling and monitoring all of the vehicles in the fleet of vehicles.

The invention is not restricted to the exemplary embodiments described here and the aspects highlighted therein. Rather, a large number of modifications which are within the scope of a person skilled in the art is possible within the scope specified by the claims.

The invention claimed is:

1. A method for adjusting a limit value for an anode overvoltage of a lithium-ion battery (310), the method comprising:
providing signal characteristics of the lithium-ion battery (310) which comprise at least voltage, current and operating temperature characteristics and a capacity state of health characteristic of the lithium-ion battery (310);
transmitting the signal characteristics and the capacity state of health characteristic of the lithium-ion battery (310) to a storage device (330), in which data relating to a plurality of lithium-ion batteries (310) are stored which comprise at least voltage, current and operating temperature characteristics and a capacity state of health characteristic and a limit value for the anode overvoltage of the respective lithium-ion batteries (310);
comparing the signal characteristics of the lithium-ion battery (310) with the data stored in the storage device (330) and choosing comparison batteries;
investigating the data relating to the comparison batteries in order to obtain an average capacity state of health characteristic and an average capacity loss of the comparison batteries and an optimized limit value, corresponding to the average capacity loss, for the anode overvoltage;

comparing the capacity state of health characteristic of the lithium-ion battery (310) with the average capacity state of health characteristic of the comparison batteries;

adjusting the limit value for the anode overvoltage of the lithium-ion battery (310) to the optimized limit value for the anode overvoltage when it is identified that the capacity state of health characteristic of the lithium-ion battery (310) is below the average capacity state of health characteristic of the comparison batteries.

2. The method as claimed in claim 1, wherein the signal characteristics and the capacity state of health characteristic of the lithium-ion battery (310) are transmitted to the storage device (330) by means of a wireless network.

3. The method as claimed in claim 2, wherein the wireless network is in the form of a mobile radio network.

4. The method as claimed in claim 1, wherein the storage device (330) is in the form of cloud storage.

5. The method as claimed in claim 1, wherein the storage device (330) has a model based on artificial intelligence for adjusting the limit value for the anode overvoltage of the lithium-ion battery (310).

6. A method for improving a capacity state of health of a lithium-ion battery (310), the method comprising:

calculating a capacity state of health of the lithium-ion battery (310) and estimating a limit value for an anode overvoltage of the lithium-ion battery (310) by means of a battery model;

calculating an optimum charging current by means of a charging model in such a way that the anode overvoltage of the lithium-ion battery (310) is greater than or equal to the limit value for the anode overvoltage;

charging the lithium-ion battery (310) with the optimum charging current and monitoring the lithium-ion battery (310), wherein a capacity state of health characteristic and signal characteristics of the lithium-ion battery (310), which comprise at least voltage, current and operating temperature characteristics, are detected;

adjusting the limit value for the anode overvoltage of the lithium-ion battery (310) in accordance with the method as claimed in claim 1; and calculating the optimum charging current by means of the charging model using the adjusted limit value for the anode overvoltage of the lithium-ion battery (310).

7. The method as claimed in claim 6, wherein the lithium-ion battery (310) is provided with a battery management system (320) for monitoring and controlling the lithium-ion battery (310) and for detecting the capacity state of health characteristic and the signal characteristics of the lithium-ion battery (310), in which battery management system the battery model and/or the charging model is/are integrated.

8. The method as claimed in claim 6, wherein the optimum charging current is calculated on the basis of an optimal control theory.

9. The method as claimed in claim 7, wherein the battery management system (320) is provided with a telematic control unit for data transmission between the battery management system (320) and the storage device (330).

10. A vehicle (300), comprising at least one lithium-ion battery (310), wherein an anode overvoltage of the at least one lithium-ion battery (310) has been adjusted by providing signal characteristics of the lithium-ion battery (310) which comprise at least voltage, current and operating temperature characteristics and a capacity state of health characteristic of the lithium-ion battery (310);

transmitting the signal characteristics and the capacity state of health characteristic of the lithium-ion battery (310) to a storage device (330), in which data relating to a plurality of lithium-ion batteries (310) are stored which comprise at least voltage, current and operating temperature characteristics and a capacity state of health characteristic and a limit value for the anode overvoltage of the respective lithium-ion batteries (310);

comparing the signal characteristics of the lithium-ion battery (310) with the data stored in the storage device (330) and choosing comparison batteries;

investigating the data relating to the comparison batteries in order to obtain an average capacity state of health characteristic and an average capacity loss of the comparison batteries and an optimized limit value, corresponding to the average capacity loss, for the anode overvoltage;

comparing the capacity state of health characteristic of the lithium-ion battery (310) with the average capacity state of health characteristic of the comparison batteries; and adjusting the limit value for the anode overvoltage of the lithium-ion battery (310) to the optimized limit value for the anode overvoltage when it is identified that the capacity state of health characteristic of the lithium-ion battery (310) is below the average capacity state of health characteristic of the comparison batteries.

11. A vehicle (300), comprising at least one lithium-ion battery (310), wherein a capacity state of health of the at least one lithium-ion battery (310) is improved by calculating a capacity state of health of the lithium-ion battery (310) and estimating a limit value for an anode overvoltage of the lithium-ion battery (310) by means of a battery model;

calculating an optimum charging current by means of a charging model in such a way that the anode overvoltage of the lithium-ion battery (310) is greater than or equal to the limit value for the anode overvoltage;

charging the lithium-ion battery (310) with the optimum charging current and monitoring the lithium-ion battery (310), wherein a capacity state of health characteristic and signal characteristics of the lithium-ion battery (310), which comprise at least voltage, current and operating temperature characteristics, are detected;

adjusting the limit value for the anode overvoltage of the lithium-ion battery (310); and calculating the optimum charging current by means of the charging model using the adjusted limit value for the anode overvoltage of the lithium-ion battery.

* * * * *